March 7, 1967 W. E. BRAY 3,308,308
SQUARE-WAVE PULSE-GENERATOR EMPLOYING TRIGGERED AVALANCHE
TRANSISTOR AND TWO EQUAL-LENGTH DELAY-LINES
CONNECTED THERETO TO PROVIDE SHARP CUTOFF
Filed June 9, 1964

INVENTOR
WILLIAM E. BRAY

BY Lane, Aitken, Dunner & Ziems
ATTORNEYS

United States Patent Office 3,308,308
Patented Mar. 7, 1967

3,308,308
SQUARE-WAVE PULSE-GENERATOR EMPLOYING TRIGGERED AVALANCHE TRANSISTOR AND TWO EQUAL-LENGTH DELAY-LINES CONNECTED THERETO TO PROVIDE SHARP CUTOFF
William E. Bray, Houston, Tex., assignor to Texas Instruments Incorporated, Dallas, Tex., a corporation of Delaware
Filed June 9, 1964, Ser. No. 373,637
5 Claims. (Cl. 307—88.5)

This invention relates to pulse generators and more particularly to a pulse generator which will generate square wave pulses with rise and fall times of less than one nanosecond.

Modern electronic devices are capable of being switched from one state to another in a time interval in the lower nanosecond range. For example, computer diodes exhibit reverse recovery times of less than ten nanoseconds and have forward turn-on times of much less than their reverse recovery times. To measure these parameters stimulus pulses having rise and fall times of less than one nanosecond are needed. Moreover, the inductive effect of the diode is often of interest, in which case the stimulus pulses must have flat tops with minimum overshoot. Typical switching time parameters of transistors are less than fifty nanoseconds and the measurement of these parameters require stimulus pulses with rise and fall times of less than ten nanoseconds. Also the testing of ferrite cores and thin films requires stimulus pulses with fast rise and fall times and high current amplitudes and the pulses must be produced at high repetition frequencies.

Prior to the present invention, pulses for testing devices which require such fast rise and fall times were generated by means of mercury relays or secondary emission pentodes. The mercury relay systems however are unsatisfactory because their pulse repetition frequency is limited to about 500 cycles per second and the generated pulses have a time jitter between the trigger source and the output which is in the microsecond range. The secondary emission pentode systems have typical vacuum tube limitations in their power supply requirements, the amount of power dissipated, the volume occupied, and their trigger sensitivity.

The present invention provides a pulse generator which will produce flat topped pulses having rise and fall times of less than one nanosecond without the disadvantages of the mercury relay and secondary emission pentode systems. In accordance with the present invention, the output pulses are generated by avalanche multiplication in a transistor, which is triggered by a pulse applied to the base of the transistor. One end of a delay or charge line is connected to the collector of a transistor. The other end of this delay line is open circuited. One end of a second delay or charge line, providing a delay equal to the delay provided by the delay line connected to the collector of the transistor, is connected to the base of the transistor. The other end of this second delay line is short circuited. When a pulse is applied to the base of the transistor initiating avalanche multiplication in the transistor, wave fronts will be propagated down the two delay lines. The wave front propagated down the delay line connected to the collector of the transistor will be reflected from the open circuited end of this delay line in phase with the incident wave and travel back to the collector of the transistor. When the reflected wave reaches the collector of the transistor, avalanche multiplication in the transistor will cease. The wave front propagated down the delay line connected to the base of the transistor will be inverted and reflected at the short circuited end of this delay line. The inverted reflected wave front will travel back to the base of the transistor and will reach the base of the transistor at the same time that the reflected wave travelling through the other delay line reaches the collector of the transistor. The reflected wave front applied to the base will reverse bias the base emitter junction and as a result the potential at the emitter will fall very abruptly. In this manner a pulse is generated having both a rise time and a fall time of less than one nanosecond.

Because the generator makes use of a transistor to generate its output pulses it does not have the disadvantages of the secondary emission pentode systems. Moreover, the pulse generator will produce its output pulses at repetition frequencies of over 100 kilocycles per second with time jitter of less than fifty picoseconds. Accordingly it does not have the disadvantages of the mercury relay systems.

In addition to testing semiconductor diodes, transistors, and ferrite cores, the pulse generator of the present invention can be used to evaluate the transient response of wide band amplifiers and to evaluate delay lines, coaxial cables, and other coaxial devices. The pulse generator of the present invention is also useful in conjunction with sampling wave oscilloscopes which require minimum time jitter and in other general purpose trigger applications.

Accordingly an object of the present invention is to provide an improved pulse generator.

Another object of the present invention is to provide a pulse generator which produces pulses with rise and fall times in the lower nanosecond range.

Another object of the present invention is to provide an improved pulse generator which produces pulses with rise and fall times of less than one nanosecond.

A further object of the present invention is to provide a pulse generator making use of the avalanche multiplication characteristics of a transistor.

A still further object of the present invention is to provide a high frequency pulse generator which produces pulses having rise and fall times in the lower nanosecond range.

A still further object of the present invention is to provide a pulse generator making use of solid state devices which will generate pulses having rise and fall times in the nanosecond range.

A still further object of the present invention is to provide a pulse generator producing pulses in the lower nanosecond range with minimum time jitter.

Further objects and advantages of the present invention will become readily apparent as the following detailed description of the invention unfolds and when taken in conjunction with the drawings wherein:

FIG. 1 illustrates one embodiment of the pulse generating circuit of the present invention; and FIG. 2 illustrates another embodiment of the pulse generating circuit of the present invention in combination with a driving circuit which will either trigger the pulse generator from internally generated clock pulses or from externally applied pulses.

In the pulse generating circuit shown in FIG. 1 power in the form of a positive voltage is applied to the circuit from a terminal 13. The terminal 13 is connected to ground through a fifty kilohm potentiometer 15. The movable contact of the potentiometer 15 is connected to the collector of an NPN avalanche transistor 19 through a 10 kilohm resistor 17. The movable contact of the potentiometer 15 is also connected to ground through a 1000 picofarad capacitor 21. The emitter of the transistor 19 is connected to ground through a 100 ohm potentiometer 22, the movable contact of which is connected to the output 23 of the circuit. The cathode of a diode 25 is connected to the output 23 and the anode of the diode 25 is connected to ground. The input of the circuit of FIG. 1, which is designated by the reference number 26, is connected to the base of the transistor 19 through a diode 28 and is connected to ground through a 50 ohm resistor 27.

The diode 28 has its anode connected to the input 26 and its cathode connected to the base of the transistor so that the diode 28 will pass positive pulses from the input 26 to the base of the transistor. The collector of the transistor 19 is connected to one end of a delay or charge line 29, the other end of which is open circuited. The delay line 29 is in the form of a coaxial cable, the shielding of which is grounded. The base of the transistor 19 is connected to one end of a delay or charge line 31, the other end of which is shorted. The delay line 31 also is in the form of a coaxial cable whose shielding is grounded. The coaxial cables comprising the delay lines 29 and 31 are selected so that they provide precisely equal delays.

The movable contact of the potentiometer 15 is adjusted so that the voltage applied across the transistor 19 will be a little below that which would cause avalanche multiplication to occur in the transistor with no input signal applied to the base of the transistor. When a pulse is applied to the input 26, it forward biases and passes through the diode 28 to forward bias the emitter base junction of the transistor 19. When the emitter base junction of the transistor 19 is forward biased, avalanche multiplication is initiated in the transistor and the collector voltage of the transistor 19 falls very rapidly. Current to the transistor 19, which at this time acts as a low impedance, is supplied from the delay line 29 and the sharp voltage drop produced at the collector of the transistor 19 is propagated down the delay line 29. When the wave front reaches the end of the delay line 29, it is reflected without being inverted by the open circuited end of the delay line 29 and then is propagated back through the delay line 29 to the collector of the transistor 19. Since the reflected waveform is not inverted it returns to the collector of the transistor 19 as a negative going wave front.

When the negative going reflected wave front reaches the collector of the transistor 19, the charge from the delay line 29 will be depleted and avalanche multiplication in the transistor will cease. Thus avalanche multiplication will occur in the transistor 19 for the time it takes the wave front to travel down the delay line 29 and back, or in other words, for a time interval equal to twice the length of the delay line.

When avalanche multiplication is initiated in the transistor 19, the potential at the emitter of the transistor will rise very rapidly. The potential at the base of the transistor will rise with the rise in emitter potential so that a positive going wave front is produced at the base of the transistor. This positive going wave front travels down the delay line 31 while the wave front produced at the collector of the transistor 19 is travelling down the delay line 29. The positive going wave front travelling down the delay line 31 is inverted and reflected by the short circuited end of the delay line 31 and then travels back to the base of the transistor 19. Because the electrical length of the delay line 31 is the same as the electrical length of the delay line 29, the reflected wave front in the delay line 31 will reach the base of the transistor 19 at the same time that the reflected wave front in the delay line 29 reaches the collector of the transistor 19. Thus at the same time that the negative going reflected wave front is applied to the collector of the transistor 19 a negative going wave front will also be applied to the base of the transistor 19 from the delay line 31.

The stopping of the avalanche multiplication in the transistor would cause the potential at the emitter of the transistor to fall, but if the delay line 31 were not connected to the base, the fall in potential at the emitter would be relatively slow because the emitter potential can fall only as fast as the stored charge, both external and internal, can be depleted. When the reflected negative going wave front is applied to the base of the transistor, it reverse biases the base emitter junction and depletes the stored charge. As a result, the emitter potential falls very abruptly when the reflected wave fronts are applied to the collector and base of the transistor 19.

In this manner a pulse is produced at the emitter of the transistor 19 having a rise and fall time of less than one nanosecond. The pulse produced at the emitter of the transistor 19 is applied to the output 23 through the potentiometer 22, which can be used to adjust the amplitude of the output pulse. The width of the pulse produced depends upon the length of the delay lines 29 and 31 and by replacing the delay lines 29 and 31 with other delay lines of different lengths the width of the pulse produced can be selectively varied. The characteristic impedance of each of the delay lines 29 and 31 is preferably selected to equal the impedance of the circuit at the input of the delay line so that the reflected wave is dissipated when it gets back to the input of the delay line. The diode 25 serves to prevent any negative potential build up and the output 23 as a result of the negative going wave front applied at the base of the transistor 19 when avalanche multiplication in the transistor ceases and the emitter of the transistor undergoes its rapid fall in potential.

In the embodiment of the pulse generating circuit shown in FIG. 2, the collector of an NPN avalanche transistor 35 is connected to a source of positive voltage applied at a terminal 36 through a two kilohm resistor 37 and a one millihenry inductor 39. A diode 41 has its cathode connected to the source of potential applied at the terminal 36 and has its anode connected to the collector of the transistor 35. One end of a delay line 43 in the form of a coaxial cable is connected to the collector of the transistor 35. The other end of delay line 43 is open circuited. The emitter of the transistor 35 is connected to ground through the resistance of a 100 ohm potentiometer 45, the movable contact of which is connected to the output 47 of the circuit. The cathode of a diode 49 is connected to the emitter of the transistor 35 and the anode of the diode 49 is connected to ground. The base of the transistor 35 is connected to one end of a delay line 51, the other end of which is short circuited. The delay line 51 like the delay line 43 is in the form of a coaxial cable. The shielding of the coaxial cables comprising the delay lines 43 and 51 are both connected to ground.

Pulses from the driving circuit in the system shown in FIG. 2 are applied to the avalanche transistor pulse generator circuit through a transformer 53. One side of the secondary 55 of the transformer 53 is connected to ground and the other side of the secondary 55 is connected to the base of the transistor 35 through a diode 57, which has a polarity to pass positive trigger pulses from the transformer 53 to the base of the transistor 35.

The avalanche pulse generator circuit shown in FIG. 2 operates in essentially the same manner as that of FIG. 1. The positive potential applied at terminal 36 is selected so that the voltage across the transistor 35 will be a little below that which would cause avalanche multiplication to occur in the transistor 35 with no input pulse or signal applied to the base of the transistor 35. When a positive trigger pulse is applied to the base of the transistor 35, it triggers avalanche multiplication in the transistor 35 and, as a result, the potential at the collector of the transistor 35 drops sharply to form a negative going wave front and the potential at the emitter of the transistor 35 rises sharply to form the leading edge of the output pulse from the pulse generator. The rise of potential at the emitter of the transistor 35 takes place in less than one nanosecond. The potential at the base of the transistor 35 rises with the potential at the emitter of the transistor 35 so that a positive going wave front is produced at the base of the transistor 35. The negative going wave front produced at the collector of the transistor 35 will travel down the delay line 43 and the positive going wave front produced at the base will travel down the delay line 51. The negative going wave front travelling down the delay line 43 will be reflected from the open circuited end of the delay line 43 without inversion and will travel back to the collector of the transistor 35, at which time the stored charge in the delay line 43 will be depleted. Accordingly, when the reflected wave front reaches the collector of the transistor 35, avalanche multiplication in the transistor 35 will cease. The positive going wave front travelling down delay line 51 will be inverted and reflected from the short circuited end of the delay line 51 and will thus travel back as a negative going wave front. This reflected negative going wave front will be applied to the base of the transistor 35 at the same time that the negative going wave front from the delay line 43 is applied to the collector of the transistor 35 because the delays provided by the delay lines 43 and 51 are selected to be equal. The negative going wave front applied to the base of the transistor 35 from the delay line 51 makes the potential at the emitter of the transistor 35 fall very rapidly and thus produces a rapidly falling trailing edge in the output pulse of the circuit. The fall time will be less than one nanosecond. The diode 49 performs the same function in the circuit of FIG. 2 that the diode 25 performs in the circuit of FIG. 1 in that it prevents a negative voltage from being produced at the emitter of the transistor 35 when avalanche multiplication in the transistor 35 ceases. The inductor 39 serves to delay the voltage built up at the collector of the transistor 35 until the transistor 35 is turned off by the reflected wave fronts applied to the base and collector.

The driving circuit of the system supplying trigger pulses to the base of the transistor 35 can either operate from an internal clock or in response to externally applied clock pulses. In the driving circuit the collector of an avalanche NPN transistor 61 is connected through a 10 kilohm resistor 63 to the movable pole of a switch 65. The junction between the switch 65 and the resistor 63 is connected to the movable pole of the switch 66 through the series circuit of a 50 kilohm variable resistor 67 and a 2.5 megohm variable resistor 69. The switches 65 and 66 are ganged together so that when the switch 65 closes the switch 66 will be open and vice versa. When the switch 66 is closed, the resistors 63, 67 and 69 will be connected in series between the collector of the transistor 61 and a source +100 volts applied at a terminal 71. The resistance of a 50 kilohm potentiometer 73 is connected between the source of potential applied at terminal 71 and ground. When the switch 65 is closed, it will connect the movable arm of the potentiometer 73 to the collector of the transistor 61 through the resistor 63. The emitter of the transistor 61 is connected to ground through a diode 75, the anode of which is connected to the emitter of the transistor 61, the cathode of which is connected directly to ground. The collector of the transistor 61 is connected to ground through a 300 picofarad capacitor 77 and a 51 ohm resistor 79 connected in series. When the switch 66 is closed and the switch 65 is open, the transistor 61 is operated as a punch-through device in a relaxation oscillator. When the capacitor 77 has become sufficiently charged, the voltage across the transistor 61 will cause avalanche multiplication to occur in the transistor 61 whereupon the capacitor 77 will discharge through the transistor 61 and the voltage across the transistor 61 will drop down to a value at which avalanche multiplication ceases. At this time, the capacitor 77 will then again begin to charge until the voltage across the transistor 61 is sufficient to again cause avalanche multiplication to occur. In this manner, avalanche multiplication is cyclically initiated and ended in the transistor 61 and the circuit operates as a relaxation oscillator. The rate at which the capacitor 77 charges can be varied by varying the values of the variable resistors 67 and 69 and thus the frequency of the relaxation oscillator can be varied.

When the drive circuit is to be synchronized with an external clock pulse, the switch 66 is opened and the switch 65 is closed. The potentiometer 73 is then adjusted until the voltage applied across the transistor 61 is a little below that which would cause avalanche multiplication to occur in the transistor 61 with no input signal or pulse applied to the base of the transistor 61. The base of the transistor 61 is connected to ground through a 51 ohm resistor 81 and to an input 83 through a 100 picofarad capacitor 85. When an external clock pulse is applied to the input 83, it will trigger avalanche multiplication in the transistor 61 and the capacitor 77 will discharge through the transistor 61 until the voltage across the transistor 61 drops down to the point where avalanche multiplication ceases. The capacitor 77 then again charges up through the resistor 63 and the potentiometer 73 so that the circuit is ready for the next pulse to be applied to the input 83 and cause avalanche multiplication in the transistor 61. Thus, avalanche multiplication will be triggered in the transistor 61 in synchronism with externally applied clock pulses.

Each time avalanche multiplication is triggered in the transistor 61, a positive pulse is produced at the emitter of the transistor 61 across the diode 75. Thus, pulses will be produced across the diode 75 in accordance with the frequency selected by the resistors 67 and 69 when the system is operating from an internal clock and in accordance with the frequency of the pulses supplied to the input 63 when the system is being operated in accordance with external clock pulses.

The junction between the capacitor 77 and the resistor 79 is connected to ground through a series circuit of a 510 ohm resistor 91 and a 100 ohm resistor 93. The junction between the resistors 91 and 93 is connected to an output 95, at which an output pulse will be produced each time avalanche multiplication is initiated in the transistor 61, to provide a source of synchronization pulses.

The positive pulses produced at the emitter of the transistor 61 are applied to the base of an NPN transistor 87. The collector of the transistor 87 is connected to a source +10 volts applied at a terminal 97 through a 10 kilohm resistor 99. The terminal 97 is also connected to ground through 0.1 microfarad capacitor 101. Each time a positive pulse is applied to the base of the transistor 87 upon the triggering of avalanche multiplication in the transistor 61, the transistor 87 saturates. The collector of the transistor 87 is connected to the base of an NPN transistor 103, the emitter which is grounded and the collector of which is connected to the collector of a PNP transistor 105 through a 180 ohm resistor 107. The emitter of the transistor 105 is connected to the source of +10 volts applied at terminal 97 through the series circuit of a variable 5 kilohm resistor 109 and a 1.2 kilohm resistor 111. A Zener diode 113 connects the base of the transistor 105 to the source of +10 volts at terminal 97. The Zener diode 113 has its cathode connected to the terminal 97 and its anode connected to the base of the transistor 105. The base of the transistor 105 is also connected to ground through a 1 kilohm resistor 115 and a 0.1 microfarad capacitor 117. With this circuit arrangement the Zener diode 113 will apply a constant potential to the base of the transistor 115, which will operate as a constant current source at its collector, supplying current to the transistor 103. When the transistor 87 saturates in response to a positive pulse supplied to its base, the potential at the collector of the transistor 87 will drop and cause the current flow through the transistor 103 to be cut off. Accordingly, the constant current produced at the collector of the transistor 105 will charge a capacitor 119 connected between the collector of the transistor 105 and ground. Accordingly, the capacitor 119 will be charged at a constant rate while the current flow in the transistor 103 is cut off and the voltage across the capacitor 119 will increase linearly. The voltage across the capacitor 119 will thus increase linearly for the duration of each positive pulse produced at the emitter of the transistor 61. Between the the positive pulses produced at the emitter of the transistor 61, conduction through the transistor 87 will be cut off and the transistor 103 will saturate to discharge the capacitor 119.

The voltage produced across the capacitor 119 is applied to the base of an NPN avalanche transistor 121, the collector of which is connected through a 75 kilohm resistor 125 to a source of positive potential applied at a terminal 123. The terminal 123 is connected to ground through a 1000 picofarad capacitor 124. The emitter of the transistor 121 is connected to the anode of a diode 127, the cathode of which is grounded. The voltage applied at terminal 123 is selected to have a value so that the voltage across the transistor 121 will be a little below that which would cause avalanche multiplication to occur in the transistor 121 with no signal voltage applied to the base of the transistor 121. When the linearly increasing voltage applied at the base of the transistor 121 reaches a predetermined value, it will trigger avalanche multiplication in the transistor 121. Thus, avalanche multiplication will be triggered in the transistor 121 a predetermined time interval after avalanche multiplication is triggered in the transistor 61 and this predetermined time interval will depend upon the slope or rate of increase of the linearly increasing voltage that is produced across the capacitor 119. This rate of increase will in turn depend upon the value of the constant current supplied at the collector of the transistor 105. The value of this constant current supply can be selectably varied by means of the variable resistor 109 and thus the time interval between each initiation of avalanche multiplication in the transistor 61 and each triggering of avalanche multiplication in the transistor 121 can be selectively varied by means of the resistor 109.

The collector of the transistor 121 is connected through the series circuit of a 10 picofarad capacitor 129 and a 100 ohm potentiometer 131 to ground. The primary winding 133 of the transformer 53 is connected between the movable contact of the potentiometer 131 and ground. The capacitor 129 differentiates the voltage waveform produced at the collector 121 so that a negative pulse will be applied across the primary winding 133 of the transformer 53 each time avalanche multiplication is triggered in the transistor 121. The secondary 55 of the transformer 53 has its polarity arranged relative to the primary 133 so that the secondary 55 will apply a positive pulse through the diode 57 to the base of the transistor 35 each time a negative pulse is applied to the primary 133. Thus a positive pulse will be applied to the base of the transistor 35 and cause avalanche multiplication to occur in the transistor 35 each time avalanche multiplication occurs in the transistor 61 and each triggering of the avalanche multiplication in the transistor 35 will occur a selectively variable time interval after each initiation of avalanche multiplication in the transistor 61. Accordingly pulses will be produced at the output 47 a selectively variable time interval after each synchronization pulse is produced at output 95.

In this manner the circuit of FIGURE 2 produces square wave output pulses with rise and fall times of less than one nanosecond at a selectively variable frequency and with a time jitter between the clock pulse source and the output pulses of less than 50 picoseconds. As in the circuit of FIG. 1, the width of the output pulses can be varied by changing the length of the delay lines 43 and 51.

The pulse generators of both FIGS. 1 and 2 produce flat topped square wave output pulses with rise and fall times of less than one nanosecond. Both circuits are capable of producing output pulses at rates of over 100 kilocycles per second with time jitter of less than 50 picoseconds. The circuits described are preferred embodiments of the invention and many modifications may be made thereto without departing from the spirit and scope of the invention, which is defined in the appended claims.

What is claimed is:
1. A pulse generator comprising a transistor, means to initiate avalanche multiplication in said transistor, a first delay line having one end connected to the collector of said transistor and the other end open circuited, and a second delay line having one end connected to the base of said transistor and the other end short circuited, said second delay line providing a delay equal to that of said first delay line.

2. A pulse generator as recited in claim 1 wherein each of said first and second delay lines comprises a coaxial cable.

3. A pulse generator comprising a transistor, means to initiate avalanche multiplication in said transistor, means connected to the collector of said transistor to cause said avalanche multiplication in said transistor to cease a predetermined time interval after said initiation, and means connected to the base of said transistor to reverse bias the base emitter junction of said transistor at the same time said collector means initiates said cessation of said avalanche multiplication.

4. A pulse generator comprising a transistor, circuit means to initiate avalanche multiplication in said transistor, a first delay line connected to the collector of said transistor to apply a wave front to the collector of said transistor to cause avalanche multiplication to cease in said transistor a predetermined time interval after the initiation of said avalanche multiplication, and a second delay line connected to the base of said transistor to apply a wave front to reverse bias the base emitter junction of said transistor simultaneously with the application of the wave front by said first delay line to the collector of said transistor.

5. A pulse generator comprising a transistor, means to apply trigger pulses to the base of said transistor, current means biasing said transistor so that each of said trigger pulses triggers avalanche multiplication in said transistor, a first delay line having one end connected to the collector of said transistor and the other end open circuited, and a second delay line providing a delay equal to that provided by said first delay line and having one end connected to the base of said transistor and the other end short circuited.

References Cited by the Examiner
UNITED STATES PATENTS
2,947,884   8/1960   Horodyski _____ 328—67
3,141,981   7/1964   Henebry _____ 307—88.5

ARTHUR GAUSS, *Primary Examiner.*
J. S. HEYMAN, *Assistant Examiner.*